United States Patent
Jin et al.

(10) Patent No.: US 8,599,656 B2
(45) Date of Patent: Dec. 3, 2013

(54) PLANAR PLASMON GENERATOR WITH A SCALABLE FEATURE FOR TAMR

(75) Inventors: Xuhui Jin, San Jose, CA (US); Tobias Maletzky, San Jose, CA (US); Suping Song, Fremont, CA (US); Dayu Zhou, Fremont, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/316,989

(22) Filed: Dec. 12, 2011

(65) Prior Publication Data
US 2013/0148485 A1    Jun. 13, 2013

(51) Int. Cl.
*G11B 11/00* (2006.01)

(52) U.S. Cl.
USPC ................................. 369/13.33; 369/13.13

(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 7,596,072 B2 | 9/2009 | Buechel et al. | |
| 7,940,486 B2 | 5/2011 | Shimazawa et al. | |
| 8,014,101 B2 | 9/2011 | Shimazawa et al. | |
| 8,254,215 B1 * | 8/2012 | Tanaka et al. | 369/13.33 |
| 8,488,419 B1 * | 7/2013 | Jin et al. | 369/13.33 |
| 2008/0192376 A1 | 8/2008 | Tanaka et al. | |
| 2009/0073597 A1 * | 3/2009 | Shiramatsu et al. | 369/13.33 |
| 2010/0202256 A1 * | 8/2010 | Ito et al. | 369/13.33 |
| 2010/0315735 A1 | 12/2010 | Zhou et al. | |
| 2011/0090587 A1 | 4/2011 | Chou et al. | |
| 2011/0176398 A1 * | 7/2011 | Tanaka et al. | 369/13.33 |
| 2011/0205661 A1 | 8/2011 | Komura et al. | |
| 2011/0279920 A1 * | 11/2011 | Takano et al. | 369/13.33 |
| 2012/0020194 A1 * | 1/2012 | Jin et al. | 369/13.13 |
| 2012/0039155 A1 * | 2/2012 | Peng et al. | 369/13.33 |
| 2012/0075967 A1 * | 3/2012 | Chou et al. | 369/13.33 |
| 2012/0120781 A1 * | 5/2012 | Komura et al. | 369/13.33 |
| 2012/0147716 A1 * | 6/2012 | Hara et al. | 369/13.33 |
| 2012/0188859 A1 * | 7/2012 | Hara et al. | 369/13.33 |

OTHER PUBLICATIONS

"Coupled-mode theory for optical waveguides: an overview", by Wei-Ping Huang, 1994, Optical Society of America, vol. 11, No. 3 / Mar. 1994, pp. 963-983.

* cited by examiner

*Primary Examiner* — Tan X Dinh
(74) *Attorney, Agent, or Firm* — Saile Ackerman LLC; Stephen B. Ackerman

(57) ABSTRACT

A TAMR (Thermal Assisted Magnetic Recording) write head uses the energy of optical-laser excited surface plasmons in a scalable planar plasmon generator to locally heat a magnetic recording medium and reduce its coercivity and magnetic anisotropy. The planar plasmon generator is formed as a multi-layered structure in which one planar layer supports a propagating surface plasmon mode that is excited by evanescent coupling to an optical mode in an adjacent waveguide. A peg, which can be a free-standing element or an integral projection from one of the layers, is positioned between the ABS end of the generator and the surface of the recording medium, confines and concentrates the near field of the plasmon mode immediately around and beneath it.

35 Claims, 5 Drawing Sheets

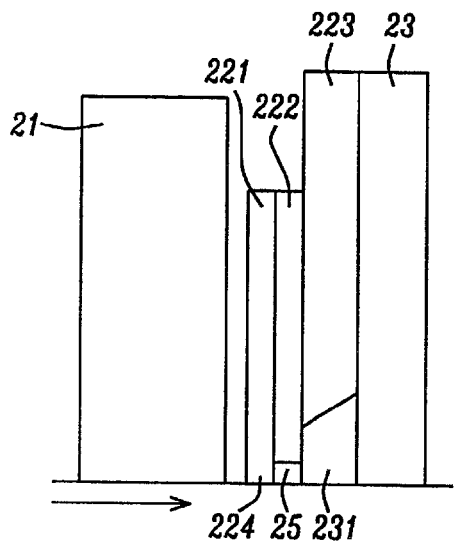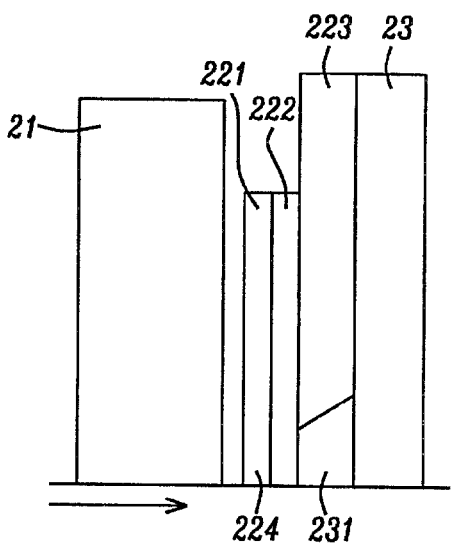
FIG. 8A            FIG. 9A
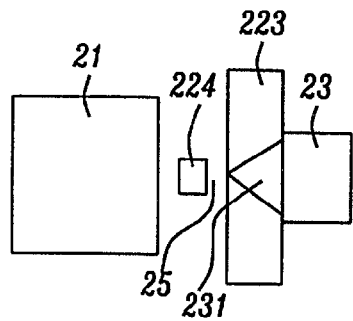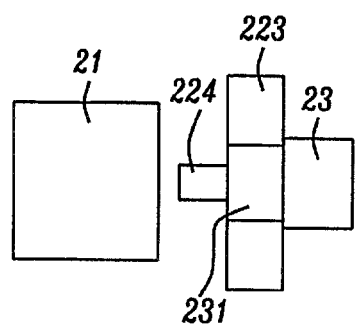
FIG. 8B            FIG. 9B
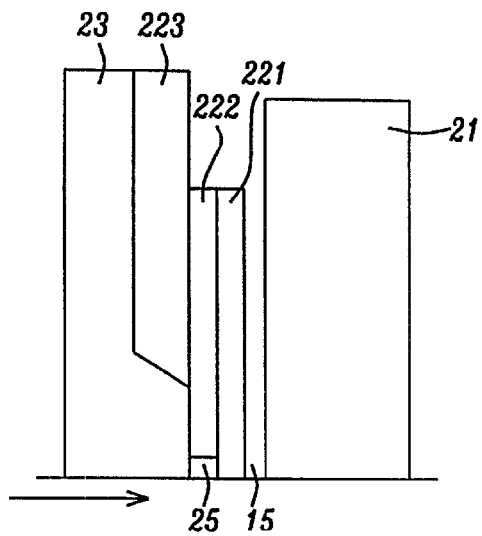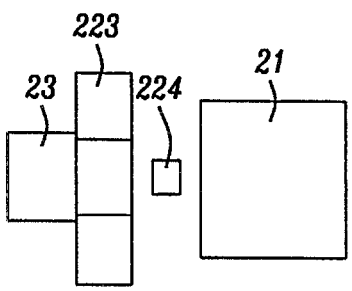
FIG. 10A           FIG. 10B

PLANAR PLASMON GENERATOR WITH A SCALABLE FEATURE FOR TAMR

BACKGROUND OF THE INVENTION

1. Field of the Invention

This invention relates to the fabrication of magnetic read/write heads that employ TAMR (thermally assisted magnetic recording) to enable writing on magnetic media having high coercivity and high magnetic anisotropy. More particularly, it relates to the use of a planar plasmon generator (PPG) to transfer the required thermal energy from the read/write head to the media by means of a propagating surface plasmon mode.

2. Description of the Related Art

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions of magnetic material on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

Prior art forms of assisted recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. These prior art assisted recording schemes either involve deep sub-micron localized heating by an optical beam or ultra-high frequency AC magnetic field generation.

The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region.

In the following, we will address our attention to a particular implementation of TAMR, namely the transfer of electromagnetic energy to a small, sub-micron sized region of a magnetic medium through interaction of the magnetic medium with the near field of an edge plasmon excited by an optical frequency laser. The transferred electromagnetic energy then causes the temperature of the medium to increase locally.

The edge plasmon is excited in a particularly shaped plasmon generator (PG) that is incorporated within the read/write head structure. The source of optical excitement can be a laser diode, also contained within the read/write head structure, or a laser source that is external to the read/write head structure, either of which directs its beam of optical radiation at the PG through a means of intermediate transfer such as an optical waveguide (WG). As a result of the WG, the optical mode of the incident radiation couples to a propagating edge plasmon mode in the PG, whereby the optical energy is converted into plasmon energy that travels along the PG. This plasmon energy is then focused by the PG onto the medium, at which point the heating occurs. When the heated spot on the medium is correctly aligned with the magnetic field produced by the write head pole, TAMR is achieved.

The following prior arts describe such TAMR implementations, some of which are in the form of an edge plasmon generator (EPG) structure having a triangular cross-section in a plane perpendicular to the direction of plasmon propagation (hereinafter denoted the y-z plane).

K. Tanaka et al. (US Publ. Pat. App. 2008/0192376) discloses a thermally assisted magnetic head.

K. Shimazawa et al. (US Publ. Pat. Appl. 2008/0198496) discloses a near-field light generator plate incorporated within a TAMR head in a HDD assembly.

Y. Zhou et al. (US Publ. Pat. Appl. 2010/0315735) discloses a plasmon antenna with a magnetic core for thermally assisted magnetic recording.

Buechal et al U.S. Pat. No. 7,596,072 teaches that the optical spot dimensions are determined by the dimensions of a small metal structure inside the head. Theoretically, the optical spot can be as small as 20 nm.

Chou et al. (U.S. Patent Application 2011/0090587) describes a plasmon generator that has a very small spot beam.

Shimazawa et al. (U.S. Pat. No. 7,940,486) and Tanaka et al. (U.S. Patent Applications 2008/0192376) disclose plasmon antennas having a triangle shape and made of a conductive material.

Kamura et al. (U.S. Patent Application 2011/0205661) also shows a plasmon generator having a triangular shape.

When a properly shaped prior art EPG is placed in the vicinity of an optical waveguide, it will support a highly confined edge plasmon (EP) mode. By means of evanescent coupling between the optical mode in the WG and the edge plasmon mode in the EPG, the optical energy in the WG can be efficiently transferred to the EPG mode, which then propagates (along the x-direction hereinafter) towards the ABS where it delivers the optical energy, and where it locally heats the recording medium placed beneath the EPG. The EPG is made of noble metals, such as Ag and Au, which are known to be excellent at generating optically driven surface plasmon modes. The local confinement of the edge plasmon mode within the EPG is determined by the angle and radius of the triangular EPG corner, the noble metal forming the EPG and the dielectric material surrounding the tip of the EPG.

Referring to FIG. 1, there is shown the result of optically modeling the cross-track dependency of the optical spot size on the tip radius in the case of 90° gold prior art design EPG. Note that the ordinate measures optical spot size in the cross-track dimension, while the abscissa measures the tip radius of the EPG. For a 25 nm tip radius the optical spot size in the medium about 100 nm. Even with a 5 nm tip radius it is difficult to obtain an optical spot size that is less than 50 nm in the medium, which is a requirement for the first generation of TAMR products. Reducing the angle of the EPG can reduce the spot size to a small extent, but both the coupling efficiency between the WG and EPG and the propagating efficiency of the EP mode will be greatly reduced due to a higher mode index and a higher damping loss of the narrower tip angle. Neither of these results are desirable and they increase the concern over EPG reliability. In addition, the level of process control required to produce such a sharp tip angle is itself challenging.

In the thermally dominant TAMR scheme, the properties of the written bit strongly depends on both the thermal spot size and shape in the recording layer and the alignment between the magnetic gradient and the thermal gradient. Therefore, it is very desirable to be able to consistently reduce the optical spot size in the recording medium by means of a PG structure with well-defined and scalable features that could support a few generations of TAMR product development. Presumably such an evolution of the TAMR product will require that features be scaled down in size, while not adversely affecting the properties of the written bit. The PG structure should also not only possess this scalability, but it should be relatively easy to fabricate and the fabrication process should be easily and well controlled.

None of these issues are addressed by the prior arts cited above. However they will be dealt with by the present invention, as will now be described in greater detail.

SUMMARY OF THE INVENTION

It is an object of this invention to produce a plasmon generating structure that has scalability and extendability in terms of reducing the optical/thermal spot size in the medium, therefore reducing track width and improving track density.

It is a further object of this invention to produce a plasmon generator structure that has the capability of improving the thermal gradient in the medium, thereby improving linear recording density.

It is still a further object of this invention to produce a plasmon generating structure that is formed in planar layers, therefore being compatible with existing magnetic head fabrication processes.

It is yet a further object of this invention to produce a TAMR writer structure that integrates the aforementioned plasmon generating structure above with an improved magnetic writer.

These objects will be realized by means of a planar plasmon generator (PPG) of surface plasmons (SP) integrated with a magnetic write pole to form a TAMR structure. A first embodiment of this structure, encompassing only the planar plasmon generator, is explained and illustrated with reference to FIGS. 2A-2E. The general operation of the structure as well as its advantages will be explained in terms of those illustrations and subsequent illustrations in FIGS. 3A, 3B and 4.

The general operation of the planar surface plasmon generator will apply as well, when it is integrated with a magnetic write pole to form a TAMR system. These integrations will be described and illustrated in FIGS. 5-10 as the second through seventh embodiments.

The first embodiment structure will include a planar plasmon generator (PPG) that supports a propagating surface plasmon (SP) mode that is confined (at an ABS end) by a free-standing (or integral) "peg" to a small region of a recording medium. The second through seventh additional specific embodiments will integrate a PPG with a magnetic pole to form a TAMR and will then be described separately with reference to later illustrations.

BRIEF DESCRIPTION OF THE DRAWINGS

The objects, features, and advantages of the present invention are understood within the context of the Description of the Preferred Embodiments as set forth below. The Description of the Preferred Embodiments is understood within the context of the accompanying figures, wherein:

FIGS. 8A-8B are side and ABS cross-sectional views of a fifth embodiment of the PPG and WG of the present invention with an adjacent magnetic stitched pole being shown.

FIGS. 9A-9B are side and ABS cross-sectional views of a sixth embodiment of the PPG and WG of the present invention with an adjacent magnetic stitched pole being shown.

FIGS. 10A-10B are side and ABS cross-sectional views of a seventh embodiment of the PPG and WG of the present invention, this embodiment showing an opposite (mirror image) mounting of the PPG and WG on a stitched pole.

DESCRIPTION OF THE PREFERRED EMBODIMENTS

Each of the seven preferred embodiments of this invention, described below, is a planar plasmon generator (PPG) and adjacent optical waveguide (WG) for a TAMR head. The PPG is a bi-layered or tri-layered structure having a planar first layer (layer 1) that supports a propagating surface plasmon (SP) fundamental mode, a second planar layer (layer 2) that suppresses the formation of other modes in the first layer and also acts as a heat sink, a third layer abutting a magnetic pole (in second through seventh embodiments) and a free-standing or integral peg, formed between the distal end of layer 1 and the ABS of the system. The peg confines a small, narrow diameter portion of the near field of the surface plasmon fundamental mode within the recording medium and, thereby, provides an efficient transfer of thermal energy to the medium for the TAMR effect to operate effectively as the head flies above the rotating medium. Through the choice of peg material, the ease of varying peg dimensions and the choice of surrounding dielectric material, the PPG is rendered scalable and the planarity of the PPG renders it easily fabricated within the current fabrication scheme. We begin first (first embodiment) with a general description of the invention and describe the method of operation of the PPG in terms of a this embodiment. Then we continue with a description of six additional specific embodiments in which the PPG is integrated with a stitched magnetic write pole.

First Embodiment

Figure 1:
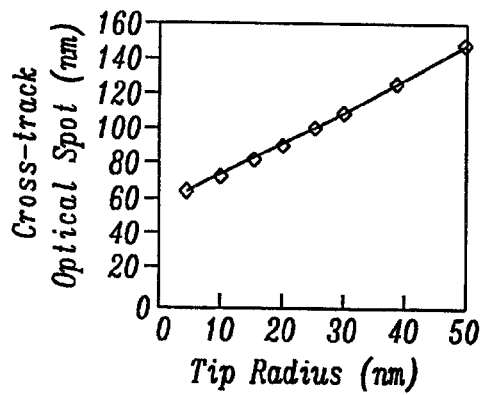
FIG. 1 is a graphical representation of the relationship between optical spot size in the cross-track dimension and tip radius for a prior art EPG (edge plasmon generator).
Figure 2A:
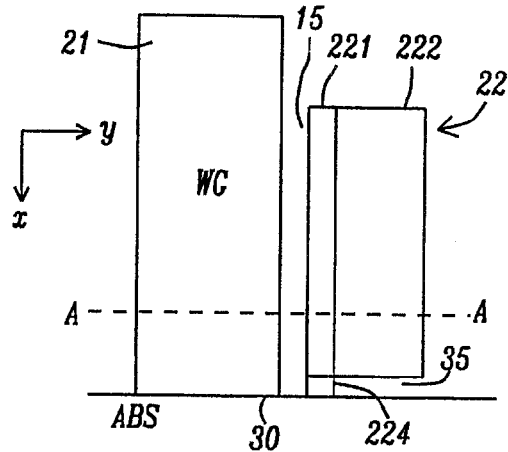
FIGS. 2A-2E are schematic cross-sectional illustrations in various planes, of a first embodiment the PPG (planar plasmon generator) of the present invention coupled to an optical WG (waveguide).

Referring first to FIG. 2A, there is shown a side cross-sectional view (in an x-y plane) of a portion of a first embodiment of a PPG for a TAMR apparatus that meets the objects of the present invention. Unlike the remaining six embodiments below, this first embodiment is the planar plasmon generator (PPG) itself and it does not include any particular configuration of the magnetic pole that is typically located adjacent to. The combination of the PPG and the adjacent magnetic pole comprises the TAMR head. These TAMR combinations will be described below as the second to seventh embodiments of the invention.

The y-axis hereinafter (in all subsequent embodiments) defines the down-track direction, the x-axis hereinafter defines a vertical direction (perpendicular to the ABS) from the back end of the head towards the ABS end, the z-axis would be a cross-track direction in the plane of the recording medium and is not shown in this figure. A line, A-A, indicates the plane along which a cross-section will be taken in FIG. 2E.

The portion of the apparatus shown includes the optical waveguide (21), hereinafter symbolized WG and, adjacent to the waveguide and separated from it by a gap (15), there is shown the planar plasmon generator (22) of the present invention, which is formed here as a bi-layered structure (but which may be multiply-layered) and hereinafter, for simplicity, referred to as a PPG. The x-axis of the figure is in a direction from the back of the WG towards the air bearing surface (ABS) of the apparatus (30), to which surface the x-axis is perpendicular. As can also be seen in this side cross-sectional view, the PPG is formed as a lamination of two planar layers, (221) and (222), with the layer (221) being adjacent to, but separated from the WG by a gap (15). Layer (221) will be denoted layer 1, and layer (222), which is formed on layer 1, will be denoted layer 2. Layers (221) and (222) both terminate a small distance (35) above the ABS (30) of the WG and, therefore, will also be a small distance above the recording medium surface during its rotation. We will denote the terminal end of a generator layer that may not actually reach the ABS, its distal end. A small free-standing "peg" (224) is placed between the distal end of layer 1 and the actual ABS (the ABS (30) of the WG). In the additional preferred embodiments described below, this peg will be formed as an integral projection of layer 1 and not be a free-standing separate element. In some cases, the formation of an integral projection might be chosen because it requires a simpler fabrication process, in other cases, the free standing form might be chosen because it provides the benefit of higher efficiency particularly when the plasmon resonance is achieved on the peg itself. However, whether it is a free standing element or a distal projection from a monolithic layer, varying the size and shape of the peg will allow the PPG of the present invention to easily scale to the resolution required of the write process in the medium.

Figure 2B:
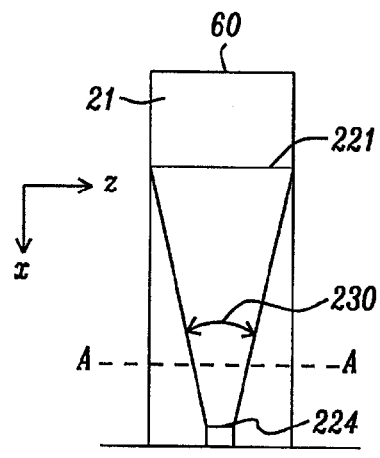

Referring now to FIG. 2B, there is shown the fabrication of FIG. 2A, but now in an x-z cross-sectional plane through layer 1 (221). As is shown in the illustration, layer 1 is triangular in the x-z plane and the small free-standing peg, (224) is substantially square or rectangular. As we shall see, the vertex angle (23) at the distal end of the triangle will play a role in determining the SP mode.

Optical energy (electromagnetic energy of optical frequencies), preferably from a solid state optical laser (not shown), couples to the dielectric waveguide (WG) through its back end (60), which is opposite to its ABS end (30). The waveguide light propagates from the back end to the ABS end as a fundamental WG mode, having little optical loss in the process. At the location of the PPG (i.e. in the overlapping region), the optical energy in the fundamental waveguide mode is transferred to a surface plasmon (SP) mode, through evanescent coupling. The SP mode is supported by the bottom surface and two side edges of layer 1 (221). The SP mode propagates along the PPG structure to its ABS surface. At that surface, the SP mode is confined about the free-standing peg (224) as a result of the shape and material structure of the peg and the dielectric material surrounding it (not shown). If the peg is in integral projection from the PPG structure, the result is the same.

The peg-confined portion of the SP mode heats the medium locally as the head flies above the rotating medium. The confinement of the optical energy by the peg will depend on the dimensions of the peg, the spacing between the ABS and the recording medium and the thermal properties of the medium layers. Reducing the dimensions of the peg will scale down the size of the optical spot.

Figure 2C:
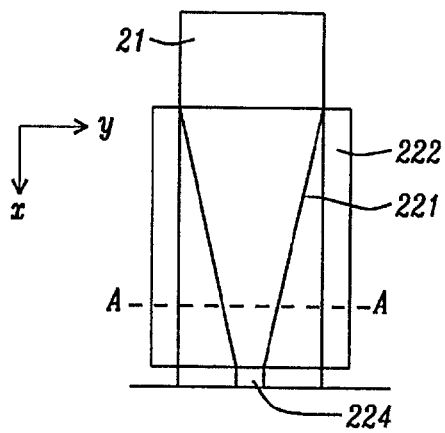

Referring now to FIG. 2C, there is shown an x-z cross section of the fabrication of FIG. 2A taken through layer 2 (222). For convenience, layer 1 (221) is shown through layer 1, although it would be hidden in this view. Layer 2 (222) is basically rectangular in shape and it serves to suppress SP modes other than the fundamental that could be excited in layer 1. It also serves as a heat sink for the PPG structure to dissipate heat generated by resistive heating of layer 1 by the SP mode as it propagates along layer 1.

Figure 2D:
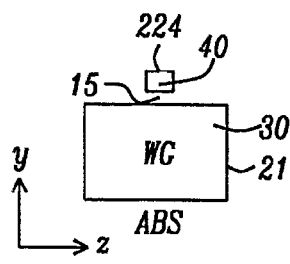

Referring now to FIG. 2D, there is shown a horizontal cross-section, in the y-z plane, taken of the fabrication in FIG. 2A at the ABS end of the fabrication. There can be seen the ABS end (30) of the WG (21) and, adjacent to it, the ABS end (40) of the peg (224).

Figure 2E:
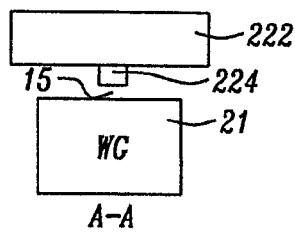

Finally, referring to FIG. 2E, there is shown a horizontal cross-section of the fabrication in FIG. 2A taken at the level of the line A-A, which is above the ABS level. In this illustration there can be seen the WG and the PPG, showing the width of layers 1 and 2 at this height above the ABS.

Figure 3A:
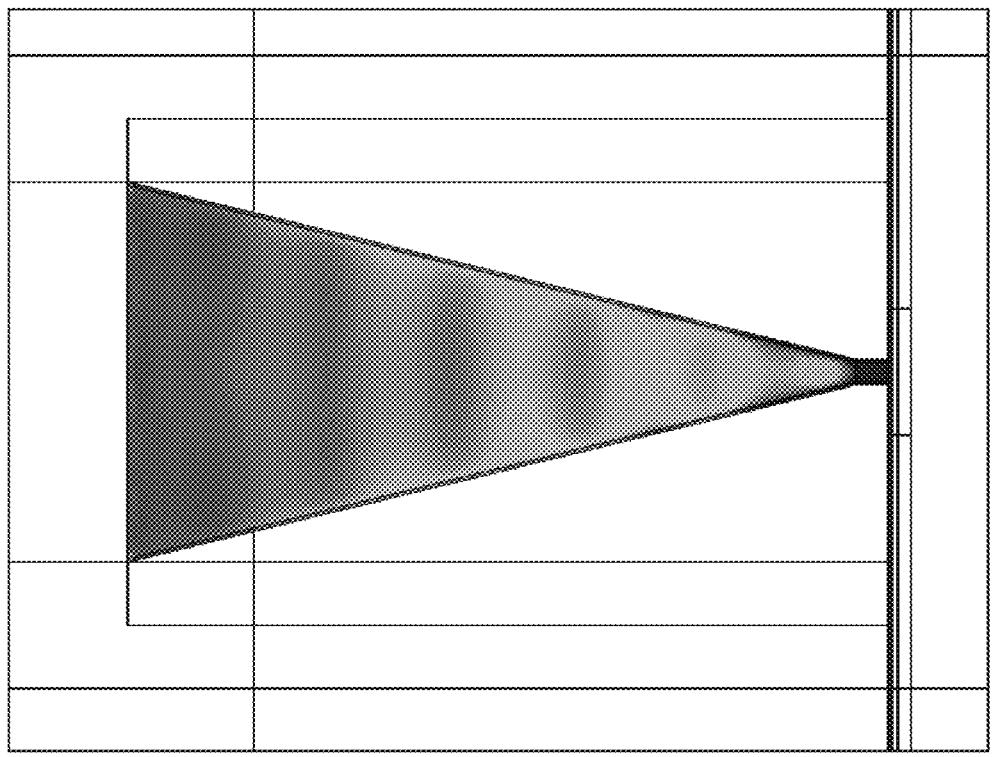
FIG. 3A is a schematic illustration of a simulation of the field of the fundamental SP (surface plasmon) mode excited in one layer of the PPG of FIG. 2A.

Referring now to FIG. 3A, there is shown a simulation of the field distribution in the propagating SP mode that is confined by layer 1 of the PPG (see (221) of FIG. 2B). Note the fundamental mode is confined along the surface of layer 1 that is closest to the WG.

Figure 3B:
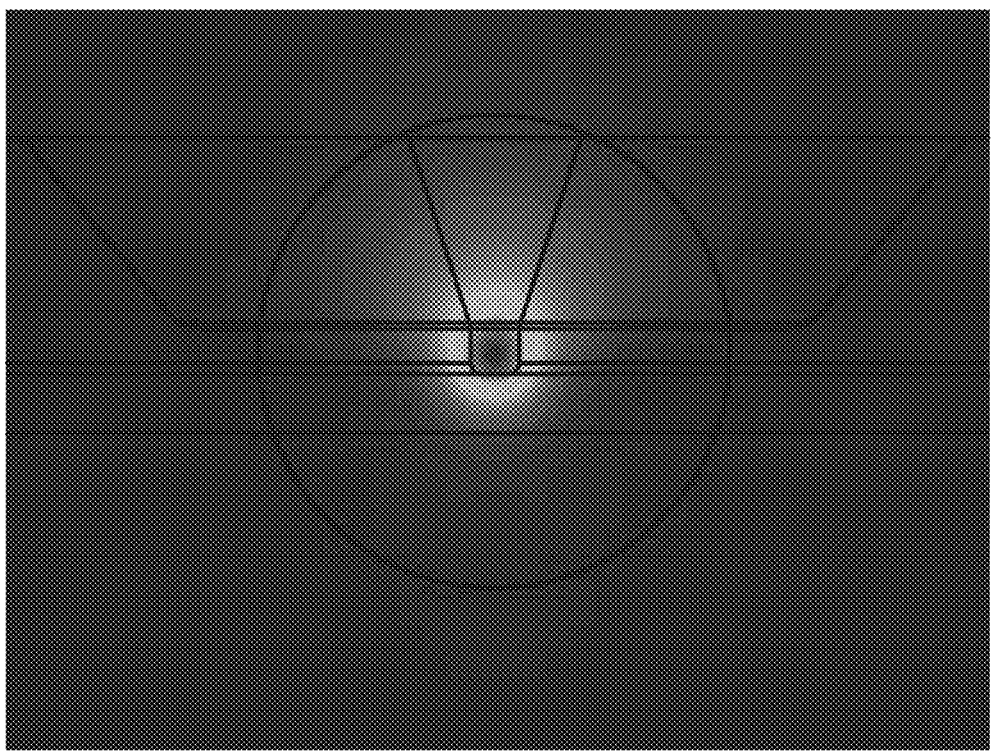
FIG. 3B is a schematic illustration of a simulation of the field of the fundamental SP of FIG. 3A that is excited beneath the peg portion of the PPG.

Referring now to FIG. 3B, there is shown the results of a simulation displaying the optical near field confined around and beneath the peg (i.e., below the ABS), in the recording layer of the medium (see, for example, FIG. 2D).

The PPG structure (i.e., layer 1, layer 2 and the peg) shown in FIG. 2A can be made of noble metals such as Au, Ag, Al, Cu or their alloys. The choice of material depends on the wavelength of the exciting light and the dielectric materials of the WG. A general guidance is to choose a metal that supports an SP of relatively long propagating length, eg. from one micron to tens of microns. Based on coupled mode theory (see, eg. Huang, Wei-Ping: "Coupled-mode theory for optical waveguides, an overview", JOSA, A, Vol. 11, issue 3, pp. 963-983 (1994)) the length of the PPG can be matched to the width of the gap ((15) in FIG. 2A) between the dielectric waveguide and the PPG layer 1 ((221) in FIG. 2A).

For a gap of width 25 nm (which is a typical width), the length of the PPG will be between approximately 0.6 microns and 1.5 microns. The vertex angle of the PPG layer 1 (angle (230) of layer (221) in FIG. 2B) can vary between approximately 15 and 60 degrees. The thickness of the PPG layer 1 can vary between a few nanometers to approximately 100 nm, depending on the requirement of optical spot size at the ABS. The thickness of layer 2 ((222) in FIG. 2A) should be such that the total thickness of the PPG bi-layer (layer 1+layer 2) is greater than 100 nm in order to properly suppress surface plasmon excitations on the top surface side of the PPG (i.e., on the side of layer 1 that contacts layer 2) and to minimize the optical loss.

The length of the peg ((224) in FIG. 2A) can be between approximately 5 and 60 nm. For the best optical efficiency, the peg length should be optimized by ABS lapping control. The width of the peg can be selected by the requirement of optical spot size and process capability.

Figure 4:
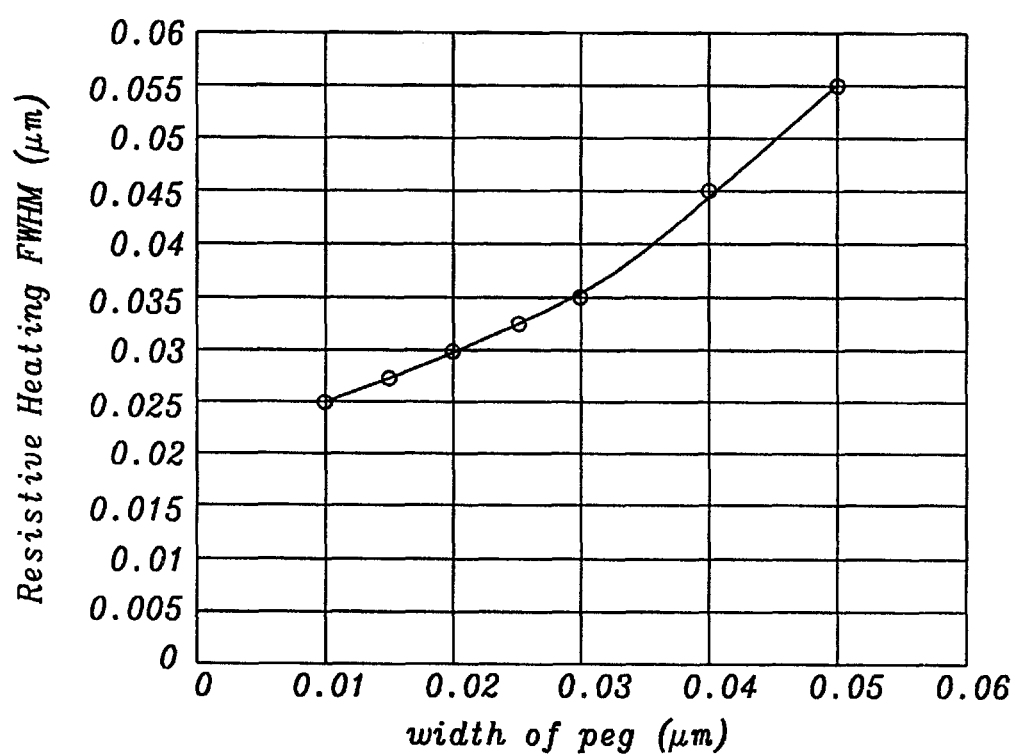
FIG. 4 is a graphical illustration of the relationship between peg width and optical spot size within a recording medium, for the PPG of FIG. 2A.

Referring to FIG. 4, there is shown a graphical relationship between optical spot size in a recording medium at 10 nm below the ABS (ordinate), and the peg width in microns (abscissa) for the present invention. For a 40 nm (0.04 micron) peg width, the FWHM optical spot size is about 45 nm. When peg width is reduced to 10 nm, optical spot size can shrink to 25 nm. Further reduction can be realized by decreasing the head to medium spacing as the strongly confined optical near-field diverges quickly with distance. The PPG structure with a scalable peg shows much better scalability of the optical spot size than prior art EPG design.

Second Embodiment

Figure 5A:
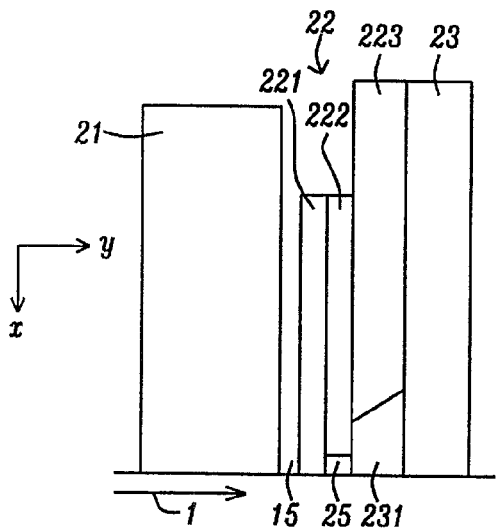
FIGS. 5A-5B are side and ABS cross-sectional views of a second embodiment of the PPG and WG of the present invention, with an adjacent magnetic stitched pole being shown.
Figure 5B:
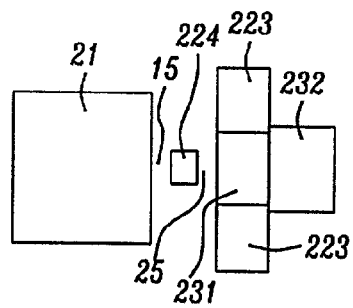

Referring to schematic FIGS. 5A and 5B, there is shown a side (x-y plane) cross-sectional view (5A), and an ABS (y-z plane) cross-sectional view (5B) of a second embodiment of a TAMR write head incorporating a PPG and adjacent optical WG of the present invention. The arrow (1) points in the direction of medium movement relative to the head.

This embodiment shows a tri-layer planar Plasmon generator (22), abutting a magnetic write pole (23). The write pole has a small stitched pole tip (231) projecting in the negative y-direction towards the WG (21). Such a stitched pole tip is well known in the art and will not be discussed herein. The write pole (23) is substantially of uniform thickness above the stitched pole tip. The WG (21) is separated from the plasmon generator by a dielectric-filled gap or spacer layer (15). The main pole connects to a yoke which is not shown here.

The planar Plasmon generator (22) in this embodiment consists of three layers, layer 1 (221) closest to the WG, layer 2 (222) that is formed on layer 1, and layer 3 (223) that is formed abutting the magnetic pole, partially surrounding the stitched pole tip (231) and extending to the ABS surface on either side of the stitched pole tip. Layer 2 (222) is therefore between layer 1 and layer 3. The layers 1 and 2 are shaped in their x-z planes like the structures shown in FIG. 2B, except that their total thickness can be less than 100 nm (ranging between approximately 10 and 60 nm) because of the presence of layer 3 and the additional thickness it provides. The total thickness (all three layers) of planar Plasmon generator (22) needs to be more than 100 nm to minimize the optical loss. At the ABS, layer 1 (221) narrows and projects to become the peg (224) (see FIG. 2B). Thus, rather than being a free-standing element, the peg in this embodiment is an extension of the vertex of layer 1.

Between the peg (224) and the stitched pole (231) there is a dielectric spacer (25), which can be formed of SiO2, SiON, Ta2O5, Al2O3 or other dielectric material in optical quality. The optical waveguide (21) is placed parallel to and in close proximity to layer 1 of the PPG (221) and is separated from layer 1 by another dielectric spacer (15) that fills the gap between them. This spacer can also be formed of SiO2, SiON, Ta2O5, Al2O3 or other dielectric material in optical quality. The optical waveguide (21) transmits an optical frequency light wave into the TAMR head from a laser diode mounted on the slider (not shown here), and couples the optical energy of the wave to the surface plasmon mode propagating along the PPG. The coupling between (21) and (221) occurs between the over-lapping regions of the two structures as evanescent coupling.

Layer 1 (221) of the planar plasmon generator (22) transmits a surface plasmon mode towards the peg (224) at its distal end. The optical energy that has been transferred to the near field of the plasmon mode is then confined underneath and around the peg (224), extending beneath the surface of the recording medium, where it locally heats the recording medium while the TAMR apparatus is flying above the rotating medium. The rotating medium rotates along the direction of arrow (1) in a direction from the leading edge of the slider (slider not shown) to its trailing edge, where the recording head and TAMR apparatus is located. The WG is located on the leading edge side of the TAMR and the pole is on the trailing edge side. The local heating reduces medium anisotropy to enable an easier switching by the field generated from the pole tip (231) of the magnetic write pole (23). As the heating location is at the leading edge side of the magnetic pole, this is called a leading optics configuration.

Referring to FIG. 5B, there is shown the fabrication of FIG. 5A, looking up at the fabrication from the ABS plane. There is shown the ABS end of the WG (21), the spacer layer (15), the peg end of layer 1 (224), the dielectric filled space (25) between the peg (224) and the stitched pole tip (231), the two sides of layer 3 (223) surrounding the stitched pole tip and the main pole (232) on which the stitched tip has been formed.

Third Embodiment

Figure 6A:
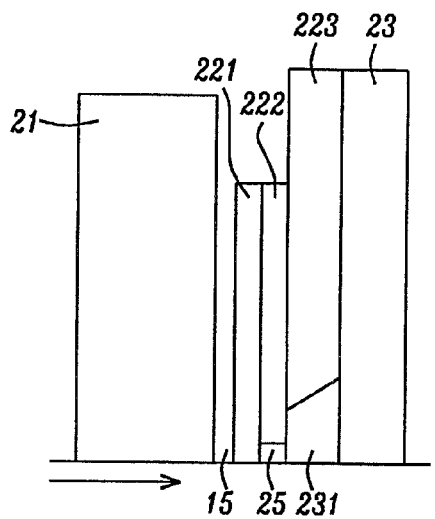
FIGS. 6A-6B are side and ABS cross-sectional views of a third embodiment of the PPG and WG of the present invention with an adjacent magnetic stitched pole being shown.
Figure 6B:
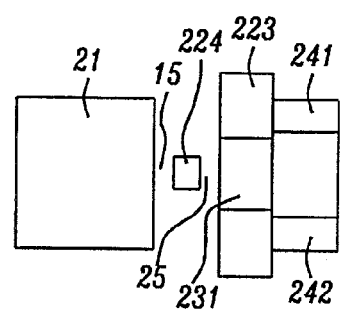

Referring to schematic FIGS. 6A and 6B, there is shown a side (x-y plane) cross-sectional view (6A), and an ABS (y-z plane) cross-sectional view (6B) of a third embodiment of a TAMR write head incorporating a PPG and adjacent optical WG of the present invention.

In every other aspect, this embodiment is same as the second embodiment, except that two blocks ((241) and (242)), visible in 6B, are placed around the magnetic pole as additional heat sinks. The blocks can be made from non-corroding metals with good thermal conductivity, such as Ru, Cr, Au etc, or made from other hard materials with good thermal conductivity, such as SiC etc. This configuration will have the advantages of further lowering the temperature of magnetic pole during writing operation so reliability of the apparatus is improved.

Fourth Embodiment

Figure 7A:
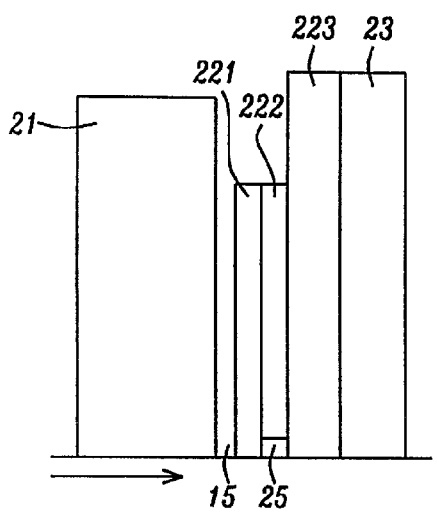
FIGS. 7A-7B are side and ABS cross-sectional views of a fourth embodiment of the PPG and WG of the present invention with an adjacent magnetic pole being shown.
Figure 7B:
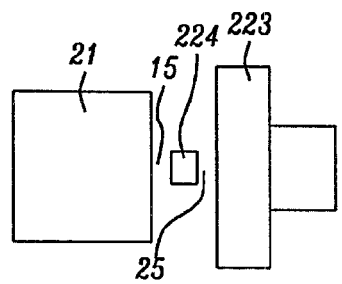

Referring to schematic FIGS. 7A and 7B, there is shown a side (x-y plane) cross-sectional view (7A), and an ABS (y-z plane) cross-sectional view (7B) of a fourth embodiment of a TAMR write head incorporating a PPG and adjacent optical WG of the present invention.

In every other aspect, this embodiment is same as in the second embodiment, except that the magnetic pole (23) does not have the stitched pole (231) as shown in FIGS. 5A and 5B. In addition, the third layer of plasmon generator (223) is extended uniformly to the ABS. In this configuration, the magnetic pole (23) is further separated from the peg (224) by the presence of layer 3 (223) and the lack of the stitched portion, so it experiences less of the near-field confined about the peg, which will result in less resistive heating due to the optical loss therefore lower temperature in the magnetic pole. This configuration will lead to better reliability. Also, this configuration induces larger distance between the heating spot and the magnetic field, which is favored in thermally-dominant TAMR case, when the thermal spot is very small and thermal gradient is large.

Fifth Embodiment

Referring to schematic FIGS. 8A and 8B, there is shown a side (x-y plane) cross-sectional view (8A), and an ABS (y-z plane) cross-sectional view (8B) of a fifth embodiment of a TAMR write head incorporating a PPG and adjacent optical WG of the present invention.

In every other aspect this embodiment is same as in the second embodiment, except that the stitch pole (231) has a triangle shape at the ABS in the y-z cross-sectional plane, as can be seen in 8B. The tip (vertex) of the stitch pole (231) is pointing towards to the peg (224), which further concentrates the magnetic field of the write head precisely within the heating spot of the plasmon near field that locally surrounds and is beneath the peg.

Sixth Embodiment

Referring to schematic FIGS. 9A and 9B, there is shown a side (x-y plane) cross-sectional view (9A), and an ABS (y-z plane) cross-sectional view (9B) of a sixth embodiment of a TAMR write head incorporating a PPG and adjacent optical WG of the present invention.

In every other aspect this embodiment is the same as in the second embodiment, except that the second layer (222) of the plasmon generator is substantially the same in shape as the first layer and it extends to the ABS. Therefore, as shown in 9B, at the ABS, the peg (224) is wider and is formed by the combination of the first and second layers. The peg is, therefore, connected directly to the stitch pole (231). This configuration will move the heating spot to the leading edge of the peg (224) (adjacent to the WG), and the heat dissipated in the peg can be transferred away through the stitch pole (231) and main pole (232).

Seventh Embodiment

Referring to schematic FIGS. 10A and 10B, there is shown a side (x-y plane) cross-sectional view (10A), and an ABS (y-z plane) cross-sectional view (10B) of a seventh embodiment of a TAMR write head incorporating a PPG and adjacent optical WG of the present invention.

In every other aspect this embodiment is same as the second embodiment (FIGS. 5A and 5B) except that every component is built in a reverse order (in the y-direction). Thus, FIG. 10A is essentially the mirror image of FIG. 5A.

In this embodiment, when the head flies over the disk, which is moving along the arrow direction relative to the head, the disk medium sees the magnetic pole first (at the leading edge side of the TAMR apparatus), then is heated locally by the plasmon generator which is now on the trailing edge side of the pole. As the heating location is at the trailing side of the magnetic pole, this is called trailing optics configuration.

As is understood by a person skilled in the art, the preferred embodiments of the present invention are illustrative of the present invention rather than being limiting of the present invention. Revisions and modifications may be made to methods, processes, materials, structures, and dimensions through which is formed a TAMR write head with a scalable planar plasmon generator having a free-standing or integral peg at an ABS end, while still providing such a TAMR write head, formed in accord with the present invention as defined by the appended claims.

What is claimed is:

1. A TAMR (thermally assisted magnetic recording) head, comprising:
    a magnetic write pole which, when energized, produces a magnetic field for writing on a magnetic recording medium rotating beneath an ABS end;
    a source of electromagnetic radiation;
    a waveguide for directing said electromagnetic radiation;
    a planar plasmon generator adjacent to said waveguide and separated from said waveguide by a gap; wherein said planar plasmon generator further comprises:
    a first layer adjacent to said waveguide and separated from said waveguide by a dielectric-filled gap, wherein a surface plasmon mode is excited by evanescent coupling to an optical mode in said waveguide;
    a second layer formed between said first layer and a third layer, wherein said second layer suppresses unwanted plasmon modes in said first layer and further acts as a heat sink;
    the third layer, formed contacting said second layer and abutting a side of said magnetic pole facing said waveguide; and
    a peg formed at an ABS end of said first layer of said planar plasmon generator, wherein a near field portion of said propagating surface plasmon mode is confined to a region within a recording medium beneath and immediately surrounding said peg and whereby said near field transfers energy to said region within said recording medium and whereby said recording medium is heated, thereby facilitating a recording process.

2. The TAMR head of claim 1 further including a block disposed along each side of said magnetic pole to act as an additional heat sink.

3. A TAMR (thermally assisted magnetic recording) head, comprising:
    a magnetic write pole which, when energized, produces a magnetic field for writing on a magnetic recording medium rotating beneath an ABS end; wherein a stitched pole tip is formed on an ABS end of said magnetic pole, projecting in a negative y-direction;
    a source of electromagnetic radiation;
    a waveguide for directing said electromagnetic radiation;
    a planar plasmon generator adjacent to said waveguide and separated from said waveguide by a gap, wherein said planar plasmon generator further comprises:
    a first layer adjacent to said waveguide and separated from said waveguide by a dielectric-filled gap, wherein a surface plasmon mode is excited by evanescent coupling to an optical mode in said waveguide;
    a second layer formed between said first layer and a third layer, wherein said second layer suppresses unwanted plasmon modes in said first layer and further acts as a heat sink;
    said third layer, formed contacting said second layer and abutting a side of said magnetic pole facing said waveguide, said third layer partially surrounding said stitched pole tip on either side in a z-direction and extending distally to said ABS while leaving said stitched pole tip exposed at its ABS end;
    a peg formed at an ABS end of said first layer of said planar plasmon generator, wherein a near field portion of said propagating surface plasmon mode is confined to a region within a recording medium beneath and immediately surrounding said peg and whereby said near field transfers energy to said region within said recording medium and whereby said recording medium is heated, thereby facilitating a recording process.

4. The TAMR head of claim 3 wherein a distal end of said second layer is above said ABS forming a dielectric-filled space between said peg and said stitched pole tip at said ABS.

5. The TAMR head of claim 3 wherein a distal end of said second layer is at said ABS.

6. The TAMR head of claim 3 wherein said first layer has a triangular cross-sectional shape in an x-z plane with a vertex angle at a distal end of between approximately 15 and 60 degrees.

7. The TAMR head of claim 3 wherein said first layer has a length between approximately 0.6 and 1.5 microns and the width of said dielectric filled gap is 25 nm.

8. The TAMR head of claim 3 wherein said first layer has a thickness between approximately 2 nanometers and 100 nanometers.

9. The TAMR head of claim 3 wherein said peg is either a free-standing element or wherein said peg is formed as a distal extension of said first layer.

10. The TAMR head of claim 6 wherein said peg is a distal extension of said first layer projecting from its vertex to said ABS.

11. The TAMR head of claim 9 wherein said peg has a length between approximately 5 and 60 nanometers.

12. The TAMR head of claim 9 wherein said peg has a width between approximately 10 nanometers and 60 nanometers.

13. The TAMR head of claim 3 wherein said gap is in the range between 5 and 50 nanometers in thickness.

14. The TAMR head of claim 3 wherein said planar plasmon generator has a total thickness greater than 100 nanometers.

15. The TAMR head of claim 1 wherein said gap between said first layer and said waveguide is filled with a dielectric material of optical quality, preferably either $Al_2O_3$, $SiO_2$, SiON or $Ta_2O_5$.

16. The TAMR head of claim 3 wherein said gap between said first layer and said waveguide is filled with a dielectric material of optical quality, preferably either $Al_2O_3$, $SiO_2$, SiON or $Ta_2O_5$.

17. The TAMR head of claim 4 wherein said space between said distal end and said ABS is filled with a dielectric material of optical quality, preferably either $Al_2O_3$, $SiO_2$, SiON or $Ta_2O_5$.

18. The TAMR head of claim 3 wherein said waveguide and said planar plasmon generator is on a leading edge side of said magnetic pole.

19. The TAMR head of claim 3 wherein said waveguide and said planar plasmon generator is on a trailing edge side of said magnetic pole.

20. A thermally assisted magnetic recording (TAMR) head, comprising:
  a source of electromagnetic radiation;
  a waveguide for directing said electromagnetic radiation;
  a planar plasmon generator formed as a planar layered structure adjacent to said waveguide and separated from said waveguide by a gap, wherein said electromagnetic radiation is coupled by evanescent coupling across said gap to a surface plasmon mode confined within said layers and propagating towards said ABS and wherein said planar layered structure comprises;
  a first layer adjacent to said waveguide and separated from said waveguide by said gap;
  a second layer formed on said first layer, wherein said second layer suppresses unwanted plasmon modes in said first layer and further acts as a heat sink; and wherein
  said first layer has a triangular cross-sectional shape in an x-z plane with a vertex angle at a distal end of between approximately 15 and 60 degrees; and
  a peg formed at an ABS end of said planar layered structure, wherein a near field portion of said propagating surface plasmon mode is confined to a region within a recording medium beneath and immediately surrounding said peg and whereby said near field transfers energy to said region within said recording medium and whereby said recording medium is heated, thereby facilitating a recording process.

21. The TAMR head of claim 20 wherein said first layer has a length between approximately 0.6 and 1.5 microns and the width of said gap is 25 nm.

22. The TAMR head of claim 20 wherein said first layer has a thickness between approximately 2 nanometers and 100 nanometers.

23. The TAMR head of claim 22 wherein the total thickness of said planar layered structure is greater than 100 nanometers.

24. The TAMR head of claim 20 wherein said peg is either a free-standing element or wherein said peg is formed as a distal extension of said first layer.

25. The TAMR head of claim 24 wherein said peg is a distal extension of said first layer projecting from its vertex to said ABS.

26. The TAMR head of claim 24 wherein said peg has a length between approximately 5 and 60 nanometers.

27. The TAMR head of claim 3 wherein a cross-sectional shape of said stitched pole tip in said ABS plane is triangular with a vertex pointing towards said peg to further concentrate a field thereat.

28. The TAMR head of claim 3 further including a block disposed along each side of said magnetic pole to act as an additional heat sink.

29. The TAMR head of claim 1 wherein said peg is either a free-standing element or wherein said peg is formed as a distal extension of said first layer.

30. The TAMR head of claim 29 wherein said peg is a distal extension of said first layer projecting from its vertex to said ABS.

31. The TAMR head of claim 29 wherein said peg has a length between approximately 5 and 60 nanometers.

32. The TAMR head of claim 29 wherein said peg has a width between approximately 10 nanometers and 60 nanometers.

33. The TAMR head of claim 1 wherein said space between said distal end and said ABS is filled with a dielectric material of optical quality, preferably either $Al_2O_3$, $SiO_2$, SiON or $Ta_2O_5$.

34. The TAMR head of claim 1 wherein said waveguide and said planar plasmon generator is on a leading edge side of said magnetic pole.

35. The TAMR head of claim 1 wherein said waveguide and said planar plasmon generator is on a trailing edge side of said magnetic pole.

* * * * *